(12) United States Patent
Tyler et al.

(10) Patent No.: US 10,993,289 B2
(45) Date of Patent: Apr. 27, 2021

(54) ADDITIVE MANUFACTURING SYSTEM FOR FABRICATING CUSTOM SUPPORT STRUCTURE

(71) Applicant: CC3D LLC, Coeur d'Alene, ID (US)

(72) Inventors: Kenneth Lyle Tyler, Coeur d'Alene, ID (US); Ryan C. Stockett, Lebanon, NH (US)

(73) Assignee: Continuous Composites Inc., Coeur D'Alene, ID (US)

( * ) Notice: Subject to any disclaimer, the term of this patent is extended or adjusted under 35 U.S.C. 154(b) by 536 days.

(21) Appl. No.: 15/896,192

(22) Filed: Feb. 14, 2018

(65) Prior Publication Data

US 2018/0229435 A1 Aug. 16, 2018

Related U.S. Application Data

(60) Provisional application No. 62/459,398, filed on Feb. 15, 2017.

(51) Int. Cl.
*B29C 64/209* (2017.01)
*B29C 64/232* (2017.01)
(Continued)

(52) U.S. Cl.
CPC ........... *H05B 3/286* (2013.01); *B29C 64/165* (2017.08); *B29C 64/209* (2017.08);
(Continued)

(58) Field of Classification Search
None
See application file for complete search history.

(56) References Cited

U.S. PATENT DOCUMENTS 3,286,305 A 11/1966 Seckel
3,809,514 A 5/1974 Nunez
(Continued)

FOREIGN PATENT DOCUMENTS

DE 4102257 A1 7/1992
EP 2589481 B1 1/2016
(Continued)

OTHER PUBLICATIONS

A. Di. Pietro & Paul Compston, Resin Hardness and Interlaminar Shear Strength of a Glass-Fibre/Vinylester Composite Cured with High Intensity Ultraviolet (UV) Light, Journal of Materials Science, vol. 44, pp. 4188-4190 (Apr. 2009).
(Continued)

*Primary Examiner* — Jacob T Minskey
*Assistant Examiner* — Baileigh Kate Darnell
(74) *Attorney, Agent, or Firm* — Ryan C. Stockett (57) ABSTRACT

An additive manufacturing system is disclosed. The additive manufacturing system may include a plate having a plurality of print heads arranged in a grid and each configured to discharge a curable material, and at least one shuttle having a plurality of print heads arranged in a row and each configured to discharge a curable material. The additive manufacturing system may also include at least one cure enhancer associated with at least one of the plate and the at least one shuttle. The at least one cure enhancer may be configured to cure the curable material as the curable material is being discharged. The additive manufacturing system may further include at least one actuator configured to move at least one of the plate and the at least one shuttle during discharge of the curable material.

16 Claims, 2 Drawing Sheets

(51) Int. Cl.

| | |
|---|---|
| *B29C 64/236* | (2017.01) |
| *B29C 70/38* | (2006.01) |
| *H05B 3/28* | (2006.01) |
| *B33Y 70/00* | (2020.01) |
| *B29C 64/165* | (2017.01) |
| *B29C 70/88* | (2006.01) |
| *B33Y 10/00* | (2015.01) |
| *B33Y 30/00* | (2015.01) |
| *B29C 64/245* | (2017.01) |
| *B29C 64/241* | (2017.01) |
| *B29C 70/20* | (2006.01) |
| *C01B 32/194* | (2017.01) |
| *B29C 64/291* | (2017.01) |
| *B29C 64/393* | (2017.01) |
| *B33Y 80/00* | (2015.01) |
| *B29L 31/00* | (2006.01) |
| *B29K 101/10* | (2006.01) |

(52) U.S. Cl.
CPC .......... *B29C 64/232* (2017.08); *B29C 64/236* (2017.08); *B29C 64/241* (2017.08); *B29C 64/245* (2017.08); *B29C 64/291* (2017.08); *B29C 64/393* (2017.08); *B29C 70/207* (2013.01); *B29C 70/384* (2013.01); *B29C 70/885* (2013.01); *B33Y 10/00* (2014.12); *B33Y 30/00* (2014.12); *B33Y 70/00* (2014.12); *C01B 32/194* (2017.08); *B29K 2101/10* (2013.01); *B29K 2995/0007* (2013.01); *B29L 2031/753* (2013.01); *B29L 2031/779* (2013.01); *B33Y 80/00* (2014.12); *H05B 2203/011* (2013.01); *H05B 2203/014* (2013.01)

(56) References Cited

U.S. PATENT DOCUMENTS

| | | | |
|---|---|---|---|
| 3,984,271 A | 10/1976 | Gilbu | |
| 3,993,726 A | 11/1976 | Moyer | |
| 4,643,940 A | 2/1987 | Shaw et al. | |
| 4,671,761 A | 6/1987 | Adrian et al. | |
| 4,822,548 A | 4/1989 | Hempel | |
| 4,851,065 A | 7/1989 | Curtz | |
| 5,002,712 A | 3/1991 | Goldmann et al. | |
| 5,037,691 A | 8/1991 | Medney et al. | |
| 5,266,021 A * | 11/1993 | Jacobson | B29C 55/00 425/334 |
| 5,296,335 A | 3/1994 | Thomas et al. | |
| 5,340,433 A | 8/1994 | Crump | |
| 5,746,967 A | 5/1998 | Hoy et al. | |
| 5,866,058 A | 2/1999 | Batchelder et al. | |
| 5,936,861 A | 8/1999 | Jang et al. | |
| 5,997,795 A * | 12/1999 | Danforth | B29C 33/3842 264/401 |
| 6,153,034 A | 11/2000 | Lipsker | |
| 6,165,406 A * | 12/2000 | Jang | G05B 19/4099 264/308 |
| 6,459,069 B1 | 10/2002 | Rabinovich | |
| 6,501,554 B1 | 12/2002 | Hackney et al. | |
| 6,658,314 B1 * | 12/2003 | Gothait | B33Y 70/00 700/119 |
| 6,799,081 B1 | 9/2004 | Hale et al. | |
| 6,803,003 B2 | 10/2004 | Rigali et al. | |
| 6,934,600 B2 | 8/2005 | Jang et al. | |
| 7,039,485 B2 | 5/2006 | Engelbart et al. | |
| 7,555,404 B2 | 6/2009 | Brennan et al. | |
| 7,795,349 B2 | 9/2010 | Bredt et al. | |
| 7,896,639 B2 * | 3/2011 | Kritchman | B29C 64/321 425/226 |
| 8,221,669 B2 | 7/2012 | Batchelder et al. | |
| 8,883,392 B2 * | 11/2014 | Napadensky | B41M 3/006 430/263 |
| 8,962,717 B2 | 2/2015 | Roth et al. | |
| 9,126,365 B1 | 9/2015 | Mark et al. | |
| 9,126,367 B1 | 9/2015 | Mark et al. | |
| 9,149,988 B2 | 10/2015 | Mark et al. | |
| 9,156,205 B2 | 10/2015 | Mark et al. | |
| 9,186,846 B1 | 11/2015 | Mark et al. | |
| 9,186,848 B2 | 11/2015 | Mark et al. | |
| 9,327,452 B2 | 5/2016 | Mark et al. | |
| 9,327,453 B2 | 5/2016 | Mark et al. | |
| 9,370,896 B2 | 6/2016 | Mark | |
| 9,381,702 B2 | 7/2016 | Hollander | |
| 9,457,521 B2 | 10/2016 | Johnston et al. | |
| 9,458,955 B2 | 10/2016 | Hammer et al. | |
| 9,527,248 B2 | 12/2016 | Hollander | |
| 9,539,762 B2 | 1/2017 | Durand et al. | |
| 9,579,851 B2 | 2/2017 | Mark et al. | |
| 9,688,028 B2 | 6/2017 | Mark et al. | |
| 9,694,544 B2 | 7/2017 | Mark et al. | |
| 9,764,378 B2 | 9/2017 | Peters et al. | |
| 9,770,876 B2 | 9/2017 | Farmer et al. | |
| 9,782,926 B2 | 10/2017 | Witzel et al. | |
| 10,105,901 B2 * | 10/2018 | Mou | B29C 64/295 |
| 2002/0008335 A1 * | 1/2002 | Leyden | B29C 64/40 264/494 |
| 2002/0009935 A1 | 1/2002 | Hsiao et al. | |
| 2002/0062909 A1 | 5/2002 | Jang et al. | |
| 2002/0113331 A1 | 8/2002 | Zhang et al. | |
| 2002/0165304 A1 | 11/2002 | Mulligan et al. | |
| 2003/0044539 A1 | 3/2003 | Oswald | |
| 2003/0056870 A1 | 3/2003 | Comb et al. | |
| 2003/0160970 A1 | 8/2003 | Basu et al. | |
| 2003/0186042 A1 | 10/2003 | Dunlap et al. | |
| 2003/0209836 A1 * | 11/2003 | Sherwood | B33Y 50/02 264/401 |
| 2003/0236588 A1 | 12/2003 | Jang et al. | |
| 2004/0170459 A1 * | 9/2004 | Taylor | B29C 64/379 400/70 |
| 2005/0006803 A1 | 1/2005 | Owens | |
| 2005/0061422 A1 | 3/2005 | Martin | |
| 2005/0104257 A1 | 5/2005 | Gu et al. | |
| 2005/0109451 A1 | 5/2005 | Hauber et al. | |
| 2005/0230029 A1 | 10/2005 | Vaidyanathan et al. | |
| 2006/0111807 A1 * | 5/2006 | Gothait | B29C 64/393 700/119 |
| 2007/0003650 A1 | 1/2007 | Schroeder | |
| 2007/0179656 A1 * | 8/2007 | Eshed | B29C 64/393 700/119 |
| 2007/0228592 A1 | 10/2007 | Dunn et al. | |
| 2008/0176092 A1 | 7/2008 | Owens | |
| 2009/0095410 A1 | 4/2009 | Oldani | |
| 2010/0217429 A1 * | 8/2010 | Kritchman | G06F 30/00 700/119 |
| 2011/0032301 A1 | 2/2011 | Fienup et al. | |
| 2011/0143108 A1 | 6/2011 | Fruth et al. | |
| 2012/0060468 A1 | 3/2012 | Dushku et al. | |
| 2012/0159785 A1 | 6/2012 | Pyles et al. | |
| 2012/0231225 A1 | 9/2012 | Mikulak et al. | |
| 2012/0247655 A1 | 10/2012 | Erb et al. | |
| 2013/0040110 A1 * | 2/2013 | Matsui | B29C 64/165 428/156 |
| 2013/0164498 A1 | 6/2013 | Langone et al. | |
| 2013/0209600 A1 | 8/2013 | Tow | |
| 2013/0233471 A1 | 9/2013 | Kappesser et al. | |
| 2013/0292039 A1 | 11/2013 | Peters et al. | |
| 2013/0337256 A1 | 12/2013 | Farmer et al. | |
| 2013/0337265 A1 | 12/2013 | Farmer | |
| 2014/0034214 A1 | 2/2014 | Boyer et al. | |
| 2014/0061974 A1 | 3/2014 | Tyler | |
| 2014/0159284 A1 | 6/2014 | Leavitt | |
| 2014/0232035 A1 | 8/2014 | Bheda | |
| 2014/0268604 A1 | 9/2014 | Wicker et al. | |
| 2014/0291886 A1 | 10/2014 | Mark et al. | |
| 2015/0035198 A1 * | 2/2015 | Saba | B29C 48/02 264/211.12 |
| 2015/0136455 A1 | 5/2015 | Fleming | |
| 2016/0012935 A1 | 1/2016 | Rothfuss | |
| 2016/0031155 A1 | 2/2016 | Tyler | |
| 2016/0046082 A1 | 2/2016 | Fuerstenberg | |
| 2016/0052208 A1 | 2/2016 | Debora et al. | |

(56) References Cited

U.S. PATENT DOCUMENTS

| | | |
|---|---|---|
| 2016/0082641 A1 | 3/2016 | Bogucki et al. |
| 2016/0082659 A1 | 3/2016 | Hickman et al. |
| 2016/0107379 A1 | 4/2016 | Mark et al. |
| 2016/0114532 A1 | 4/2016 | Schirtzinger et al. |
| 2016/0136885 A1 | 5/2016 | Nielsen-Cole et al. |
| 2016/0144565 A1 | 5/2016 | Mark et al. |
| 2016/0144566 A1 | 5/2016 | Mark et al. |
| 2016/0192741 A1 | 7/2016 | Mark |
| 2016/0200047 A1 | 7/2016 | Mark et al. |
| 2016/0243762 A1 | 8/2016 | Fleming et al. |
| 2016/0263806 A1 | 9/2016 | Gardiner |
| 2016/0263822 A1 | 9/2016 | Boyd |
| 2016/0263823 A1 | 9/2016 | Espiau et al. |
| 2016/0271876 A1 | 9/2016 | Lower |
| 2016/0297104 A1 | 10/2016 | Guillemette et al. |
| 2016/0311165 A1 | 10/2016 | Mark et al. |
| 2016/0325491 A1 | 11/2016 | Sweeney et al. |
| 2016/0332369 A1 | 11/2016 | Shah et al. |
| 2016/0339633 A1 | 11/2016 | Stolyarov et al. |
| 2016/0346998 A1 | 12/2016 | Mark et al. |
| 2016/0361869 A1 | 12/2016 | Mark et al. |
| 2016/0368213 A1 | 12/2016 | Mark |
| 2016/0368255 A1 | 12/2016 | Witte et al. |
| 2017/0007359 A1 | 1/2017 | Kopelman et al. |
| 2017/0007360 A1 | 1/2017 | Kopelman et al. |
| 2017/0007361 A1 | 1/2017 | Boronkay et al. |
| 2017/0007362 A1 | 1/2017 | Chen et al. |
| 2017/0007363 A1 | 1/2017 | Boronkay |
| 2017/0007365 A1 | 1/2017 | Kopelman et al. |
| 2017/0007366 A1 | 1/2017 | Kopelman et al. |
| 2017/0007367 A1 | 1/2017 | Li et al. |
| 2017/0007368 A1 | 1/2017 | Boronkay |
| 2017/0007386 A1 | 1/2017 | Mason et al. |
| 2017/0008333 A1 | 1/2017 | Mason et al. |
| 2017/0015059 A1 | 1/2017 | Lewicki |
| 2017/0015060 A1 | 1/2017 | Lewicki et al. |
| 2017/0021565 A1 | 1/2017 | Deaville |
| 2017/0028434 A1 | 2/2017 | Evans et al. |
| 2017/0028588 A1 | 2/2017 | Evans et al. |
| 2017/0028617 A1 | 2/2017 | Evans et al. |
| 2017/0028619 A1 | 2/2017 | Evans et al. |
| 2017/0028620 A1 | 2/2017 | Evans et al. |
| 2017/0028621 A1 | 2/2017 | Evans et al. |
| 2017/0028623 A1 | 2/2017 | Evans et al. |
| 2017/0028624 A1 | 2/2017 | Evans et al. |
| 2017/0028625 A1 | 2/2017 | Evans et al. |
| 2017/0028627 A1 | 2/2017 | Evans et al. |
| 2017/0028628 A1 | 2/2017 | Evans et al. |
| 2017/0028633 A1 | 2/2017 | Evans et al. |
| 2017/0028634 A1 | 2/2017 | Evans et al. |
| 2017/0028635 A1 | 2/2017 | Evans et al. |
| 2017/0028636 A1 | 2/2017 | Evans et al. |
| 2017/0028637 A1 | 2/2017 | Evans et al. |
| 2017/0028638 A1 | 2/2017 | Evans et al. |
| 2017/0028639 A1 | 2/2017 | Evans et al. |
| 2017/0028644 A1 | 2/2017 | Evans et al. |
| 2017/0030207 A1 | 2/2017 | Kittleson |
| 2017/0036403 A1 | 2/2017 | Ruff et al. |
| 2017/0037674 A1* | 2/2017 | Hooper ............... E06B 3/12 |
| 2017/0050340 A1 | 2/2017 | Hollander |
| 2017/0057164 A1 | 3/2017 | Hemphill et al. |
| 2017/0057165 A1 | 3/2017 | Waldrop et al. |
| 2017/0057167 A1 | 3/2017 | Tooren et al. |
| 2017/0057181 A1 | 3/2017 | Waldrop et al. |
| 2017/0064840 A1 | 3/2017 | Espalin et al. |
| 2017/0066187 A1 | 3/2017 | Mark et al. |
| 2017/0087768 A1 | 3/2017 | Bheda |
| 2017/0106565 A1 | 4/2017 | Braley et al. |
| 2017/0120519 A1 | 5/2017 | Mark |
| 2017/0129170 A1 | 5/2017 | Kim et al. |
| 2017/0129171 A1 | 5/2017 | Gardner et al. |
| 2017/0129176 A1 | 5/2017 | Waatti et al. |
| 2017/0129182 A1 | 5/2017 | Sauti et al. |
| 2017/0129186 A1 | 5/2017 | Sauti et al. |
| 2017/0144375 A1 | 5/2017 | Waldrop et al. |
| 2017/0151728 A1 | 6/2017 | Kunc et al. |
| 2017/0157828 A1 | 6/2017 | Mandel et al. |
| 2017/0157831 A1 | 6/2017 | Mandel et al. |
| 2017/0157844 A1 | 6/2017 | Mandel et al. |
| 2017/0157851 A1 | 6/2017 | Nardiello et al. |
| 2017/0165908 A1 | 6/2017 | Pattinson et al. |
| 2017/0173868 A1 | 6/2017 | Mark |
| 2017/0182712 A1 | 6/2017 | Scribner et al. |
| 2017/0210074 A1 | 7/2017 | Ueda et al. |
| 2017/0217088 A1 | 8/2017 | Boyd et al. |
| 2017/0232674 A1 | 8/2017 | Mark |
| 2017/0259502 A1 | 9/2017 | Hocker |
| 2017/0259507 A1 | 9/2017 | Hocker |
| 2017/0266876 A1 | 9/2017 | Hocker |
| 2017/0274585 A1 | 9/2017 | Armijo et al. |
| 2017/0284876 A1 | 10/2017 | Moorlag et al. |

FOREIGN PATENT DOCUMENTS

| | | |
|---|---|---|
| EP | 3219474 A1 | 9/2017 |
| KR | 100995983 B1 | 11/2010 |
| KR | 101172859 B1 | 8/2012 |
| WO | 2013017284 A2 | 2/2013 |
| WO | 2016088042 A1 | 6/2016 |
| WO | 2016088048 A1 | 6/2016 |
| WO | 2016110444 A1 | 7/2016 |
| WO | 2016159259 A1 | 10/2016 |
| WO | 2016196382 A1 | 12/2016 |
| WO | 2017006178 A1 | 1/2017 |
| WO | 2017006324 A1 | 1/2017 |
| WO | 2017051202 A1 | 3/2017 |
| WO | 2017081253 A1 | 5/2017 |
| WO | 2017085649 A1 | 5/2017 |
| WO | 2017087663 A1 | 5/2017 |
| WO | 2017108758 A1 | 6/2017 |
| WO | 2017122941 A1 | 7/2017 |
| WO | 2017122942 A1 | 7/2017 |
| WO | 2017122943 A1 | 7/2017 |
| WO | 2017123726 A1 | 7/2017 |
| WO | 2017124085 A1 | 7/2017 |
| WO | 2017126476 A1 | 7/2017 |
| WO | 2017126477 A1 | 7/2017 |
| WO | 2017137851 A2 | 8/2017 |
| WO | 2017142867 A1 | 8/2017 |
| WO | 2017150186 A1 | 9/2017 |

OTHER PUBLICATIONS

A. Endruweit, M. S. Johnson, & A. C. Long, Curing of Composite Components by Ultraviolet Radiation: A Review, Polymer Composites, pp. 119-128 (Apr. 2006).

C. Fragassa, & G. Minak, Standard Characterization for Mechanical Properties of Photopolymer Resins for Rapid Prototyping, 1st Symposium on Multidisciplinary Studies of Design in Mechanical Engineering, Bertinoro, Italy (Jun. 25-28, 2008).

Hyouk Ryeol Choi and Se-gon Roh, In-pipe Robot with Active Steering Capability for Moving Inside of Pipelines, Bioinspiration and Robotics: Walking and Climbing Robots, Sep. 2007, p. 544, I-Tech, Vienna, Austria.

Kenneth C. Kennedy II & Robert P. Kusy, UV-Cured Pultrusion Processing of Glass-Reinforced Polymer Composites, Journal of Vinyl and Additive Technology, vol. 1, Issue 3, pp. 182-186 (Sep. 1995).

M. Martin-Gallego et al., Epoxy-Graphene UV-Cured Nanocomposites, Polymer, vol. 52, Issue 21, pp. 4664-4669 (Sep. 2011).

P. Compston, J. Schiemer, & A. Cvetanovska, Mechanical Properties and Styrene Emission Levels of a UV-Cured Glass-Fibre/Vinylester Composite, Composite Structures, vol. 86, pp. 22-26 (Mar. 2008).

S Kumar & J.-P. Kruth, Composites by Rapid Prototyping Technology, Materials and Design, (Feb. 2009).

S. L. Fan, F. Y. C. Boey, & M. J. M. Abadie, UV Curing of a Liquid Based Bismaleimide-Containing Polymer System, eXPRESS Polymer Letters, vol. 1, No. 6, pp. 397-405 (2007).

(56) References Cited

OTHER PUBLICATIONS

T. M. Llewelly-Jones, Bruce W. Drinkwater, and Richard S. Trask; 3D Printed Components With Ultrasonically Arranged Microscale Structure, Smart Materials and Structures, 2016, pp. 1-6, vol. 25, IOP Publishing Ltd., UK.

Vincent J. Lopata et al., Electron-Beam-Curable Epoxy Resins for the Manufacture of High-Performance Composites, Radiation Physics and Chemistry, vol. 56, pp. 405-415 (1999).

Yugang Duan et al., Effects of Compaction and UV Exposure on Performance of Acrylate/Glass-Fiber Composites Cured Layer by Layer, Journal of Applied Polymer Science, vol. 123, Issue 6, pp. 3799-805 (May 15, 2012).

\* cited by examiner

ADDITIVE MANUFACTURING SYSTEM FOR FABRICATING CUSTOM SUPPORT STRUCTURE

RELATED APPLICATIONS

This application is based on and claims the benefit of priority from U.S. Provisional Application No. 62/459,398 that was filed on Feb. 15, 2017, the contents of which are expressly incorporated herein by reference.

TECHNICAL FIELD

The present disclosure relates generally to a manufacturing system and, more particularly, to an additive manufacturing system for use in fabricating a custom support structure.

BACKGROUND

Extrusion manufacturing is a known process for producing continuous structures. During extrusion manufacturing, a liquid matrix (e.g., a thermoset resin or a heated thermoplastic) is pushed through a die having a desired cross-sectional shape and size. The material, upon exiting the die, cures and hardens into a final form. In some applications, UV light and/or ultrasonic vibrations are used to speed the cure of the liquid matrix as it exits the die. The structures produced by the extrusion manufacturing process can have any continuous length, with a straight or curved profile, a consistent cross-sectional shape, and excellent surface finish. Although extrusion manufacturing can be an efficient way to continuously manufacture structures, the resulting structures may lack the strength required for some applications.

Pultrusion is a common way to manufacture high-strength composite parts. During pultrusion manufacturing, individual fiber strands, braids of strands, and/or woven fabrics are pulled from corresponding spools into a resin bath and through a stationary die. The resin is then allowed to cure and harden. Due to the pulling of the fibers prior to curing, some of the fibers may retain a level of tensile stress after curing is complete. This tensile stress can increase a strength of the composite part in the direction in which the fibers were pulled. Although pultrusion manufacturing can be used to produce some large composite parts, it can also be problematic. In particular, conventional pultrusion manufacturing processes may provide little flexibility in the design and/or use of the composite part.

The disclosed additive manufacturing system is directed to overcoming one or more of the problems set forth above and/or other problems of the prior art.

SUMMARY

In one aspect, the present disclosure is directed to an additive manufacturing system. The additive manufacturing system may include a plate having a plurality of print heads arranged in a grid and each configured to discharge a curable material, and at least one shuttle having a plurality of print heads arranged in a row and each configured to discharge a curable material. The additive manufacturing system may also include at least one cure enhancer associated with at least one of the plate and the at least one shuttle. The at least one cure enhancer may be configured to cure the curable material as the curable material is being discharged. The additive manufacturing system may further include at least one actuator configured to move at least one of the plate and the at least one shuttle during discharge of the curable material.

In another aspect, the present disclosure is directed to another additive manufacturing system. This additive manufacturing system may include a print bed, and a z-plate having a plurality of print heads arranged in a grid. Each of the plurality of print heads may be configured to discharge a curable material onto the print bed to create a plurality of columns that extend in a direction normal to the print bed. The additive manufacturing system may also include an x-shuttle having a plurality of print heads arranged in a row. Each of the plurality of print heads of the x-shuttle may be configured to discharge a curable material during movement in a direction generally orthogonal to a movement direction of the z-plate. The additive manufacturing system may further include a y-shuttle having a plurality of print heads arranged in a row. Each of the plurality of print heads of the y-shuttle may be configured to discharge a curable material during movement in a direction generally orthogonal to the movement direction of the z-plate and generally orthogonal to the movement direction of the x-shuttle. The additive manufacturing system may additionally include a cure enhancer configured to cure the curable material as the curable material is being discharged, at least one actuator configured to move at least one of the z-plate, the x-shuttle, and the y-shuttle during discharge of the curable material, and a controller in communication with the cure enhancer and the at least one actuator. The controller may be configured to cause the at least one actuator to move the plate in a direction normal to the print bed during discharging to fabricate a plurality of columns, and to cause the at least one actuator to move the x- and y-shuttles in directions generally orthogonal to the normal direction after the plurality of columns have reached a threshold height to create desired contours over terminal ends of the plurality of columns. The controller may be further configured to cause the cure enhancer to expose the curable material to cure energy during discharge.

In yet another aspect, the present disclosure is directed to a method of additively manufacturing a support structure. The method may include simultaneously discharging from a grid of print heads a plurality of columns, and cross-linking the plurality of columns. The method may also include simultaneously discharging a plurality of tracks that form contours across ends of the plurality of columns.

DETAILED DESCRIPTION

Figure 1:
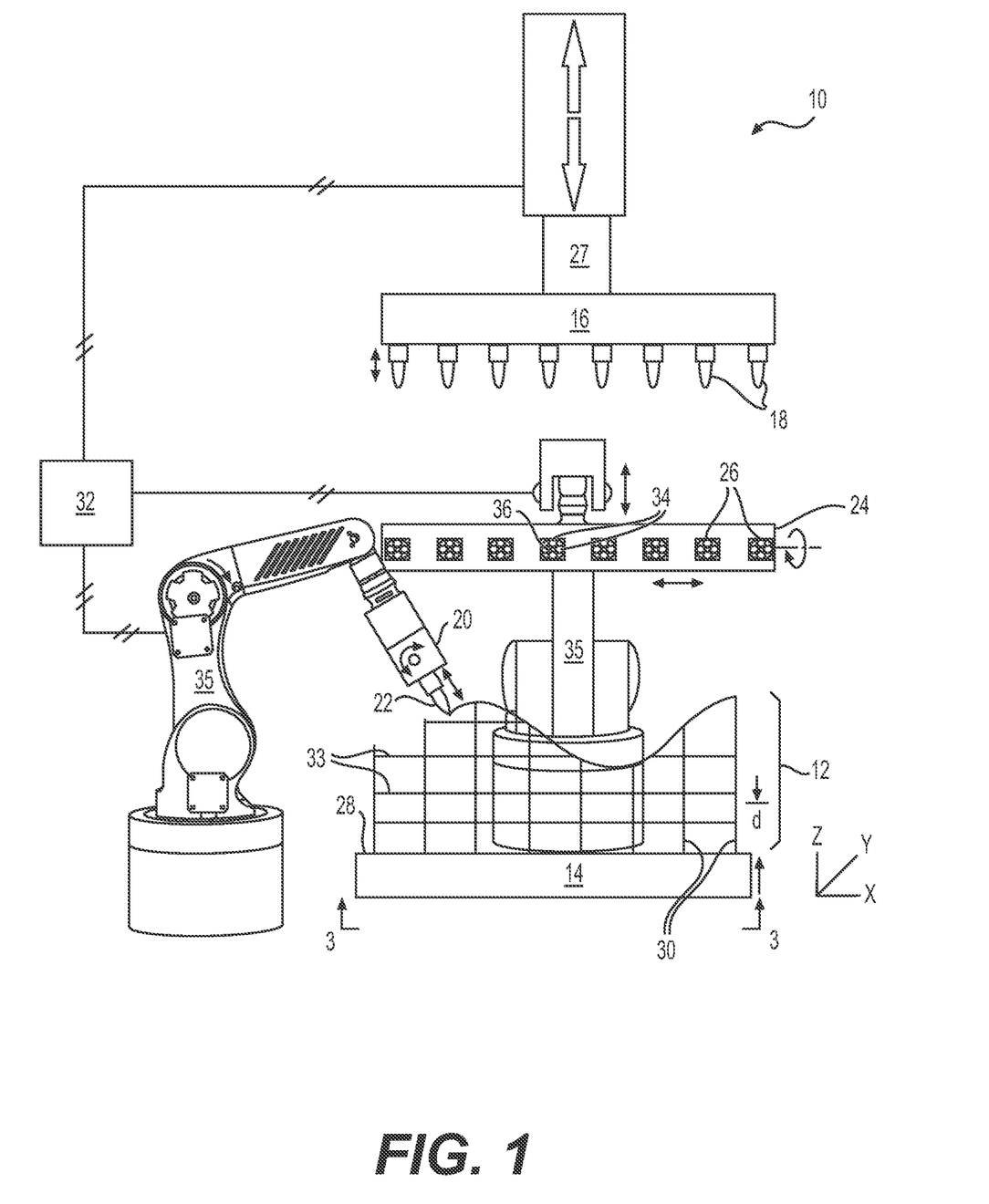
FIG. 1 is a diagrammatic illustration of an exemplary system for additively manufacturing a composite structure.
Figure 2:
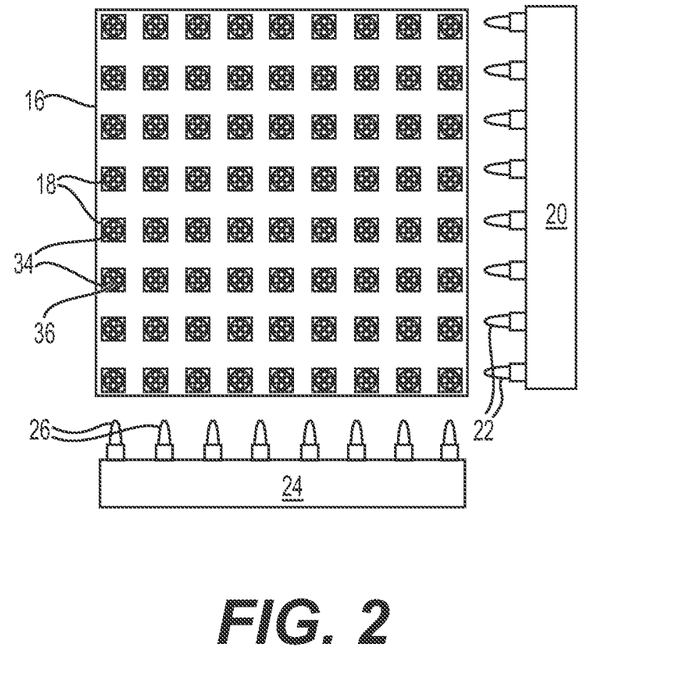
FIG. 2 is another view of the system of FIG. 1.
Figure 3:
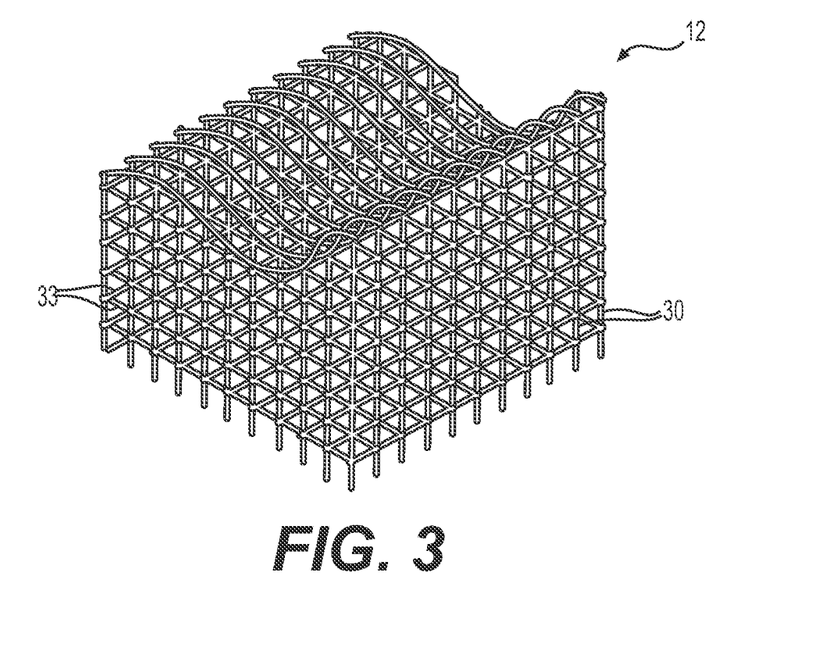
FIG. 3 is an isometric illustration of an exemplary composite part that may be manufactured via the system of FIGS. 1 and 2.

FIGS. 1 and 2 illustrate an exemplary system 10, which can be used to quickly and efficiently produce a lattice-like structure 12 (shown in FIGS. 1 and 3) that functions as a multi-dimensional support. In one example, structure 12 may be associated with the medical industry and used to provide customized body support for a premature baby, a burn victim, or another patient in a manner that promotes growth and/or healing. As can be seen in FIG. 1, system 10 may include, among other things, a print bed 14 upon which structure 12 is additively manufactured, a z-plate 16 having a plurality (e.g., a 2-D grid) of print heads 18, an x-shuttle 20 having a plurality (e.g., a row) of print heads 22 (only one shown in FIG. 1), and a y-shuttle 24 having a plurality (e.g., a row) of print heads 26.

Print bed 14 may form a platform onto which print heads 18, 22, and 26 deposit tracks (e.g., individual fibers, tows, ribbons, sheets, and/or tubes) of material during fabrication of structure 12. Print bed 14 may be moveable (e.g., in the x-direction, in the y-direction, and/or in the z-direction) or stationary, and heated or cooled for particular applications. In one embodiment, print bed 14 is the floor of an enclosure (not shown) in which structure 12 is to be permanently or temporarily located, for example a hospital room or an infant incubator.

Z-plate 16 may be configured to move (e.g., translate via a linear actuator 27, such as a hydraulic piston, an electric lead screw, etc.) in any one or more of the x-, y-, and z-directions during discharge of material from print heads 18 onto print bed 14. The material discharging from print heads 18 may primarily be used to vertically support later operations of x- and y-shuttles 20, 24. For example, z-plate 16 may begin discharging material at an upper surface 28 of print bed 14, and move in a normal direction away from upper surface 28 during continued discharge, such that a plurality of columns 30 protrude from print bed 14 toward z-plate 16. Each print head 18 may be independently controlled (e.g., by a controller 32) to selectively move (in and out of z-plate 16) and/or to stop discharging material at a particular distance away from print bed 14, such that each resulting column 30 has a different and finite height. In this way, a pixilated upper surface may be collectively created for structure 12 by the terminal ends of columns 30.

In some applications, depending on a required height of columns 30, horizontal bracing 33 may be required to inhibit buckling, deflection, or instabilities within structure 12. In these applications, z-plate 16 may be caused to extend only a threshold distance d away from print bed 14 in the z-direction, and then to pause vertical motion and cross-link columns 30, before extending further in the z-direction. Cross-linking may be performed, for example, by causing z-plate 16 to move transversely (i.e., in the x- and y-directions) across the ends of columns 30 while continuously discharging material. In one embodiment, the transverse movements of z-plate 16 may be generally circular (not shown), triangular (not shown), or rectangular (shown in FIG. 3) and used to connect two or more adjacent columns 30. After the bracing connections are made, z-plate 16 may resume movement in the z-direction to further extend one or more of columns 30 (i.e., depending on which of print heads 18 are active at the time).

In an alternative embodiment, after z-plate 16 has extruded columns 30 to the threshold distance d, one or more of print heads 18 may be caused to stop discharging material and z-plate 16 may be moved away from print bed 14. At this time, x- and/or y-shuttles 20, 24 may be moved (e.g., via one or more corresponding actuators 35, such as a multi-axis robotic arm, a gantry, a gantry/arm hybrid, etc.) across columns 30 in the x- and/or y-directions, respectively, during discharge of material from print heads 22 and/or 26, such that a grid of material is deposited on the terminal ends of columns 30 to connect columns 30 together. Actuator(s) 35 may be configured to linearly move the corresponding shuttle(s) 20 and/or 24 in the x-direction, the y-direction, and the z-direction, and/or to rotate shuttle(s) 20 and/or 24 about one or more axes (e.g., a longitudinal axis of the shuttle that is generally aligned with the row of corresponding heads, or about an axis of one of the heads). In addition, in some embodiments, individual heads 22 and/or 26 may be selectively moved in-and-out of the corresponding plate or shuttle and/or side-to-side, such that the heads extend a different distance and/or have a different spacing during material discharge. It is contemplated that the material discharged by print heads 22 and/or 26 may be the same as or different from the material discharged by print heads 18 (e.g., different in makeup, size, shape, consistency, etc.).

Once a pixilated upper surface has been created for structure 12 from the terminal ends of columns 30 at the desired height by z-plate 16, z-plate 16 may be moved away from print bed 14. And in the same manner described above, with regard to cross-linking, x- and/or y-shuttles 20, 24 may be moved over the terminal ends of columns 30 in the x-, y-, and/or z-directions during discharge of material from print heads 22 and/or 26, such that a contoured network of interlocking tracks is deposited on the terminal ends.

The material discharging from print heads 18, 22, and/or 26 may be a composite material, and include a reinforcement that is at least partially encapsulated by a matrix. The matrix may be a liquid resin (e.g., a zero-volatile organic compound resin) that is curable. Exemplary matrixes include thermosets, single- or multi-part epoxy resins, polyester resins, cationic epoxies, acrylated epoxies, urethanes, esters, thermoplastics, photopolymers, polyepoxides, thiols, alkenes, thiol-enes, and more. In one embodiment, the matrix may be pressurized by an external device (e.g., an extruder or another type of pump) that is fluidly connected to print head(s) 18, 22, and 26 via corresponding conduits (not shown). In another embodiment, however, the pressure of the matrix may be generated completely inside of print head(s) 18, 22, and 26 by a similar type of device and/or simply be the result of gravity acting on the matrix. In some instances, the matrix inside print head(s) 18, 22, and 26 may need to be kept cool and/or dark in order to inhibit premature curing; while in other instances, the matrix may need to be kept warm for the same reason. In either situation, print head(s) 18, 22, and 26 may be specially configured (e.g., insulated, chilled, and/or warmed) to provide for these needs.

The matrix may be used to coat any number and type of reinforcements and, together with the reinforcements make up composite forms of structures 12. The reinforcements may include single strands, a tow or roving of several strands, or a weave of many strands. The strands may include, for example, carbon fibers, vegetable fibers, wood fibers, mineral fibers, glass fibers, metallic wires, ceramic fibers, basalt fibers, optical tubes, etc. The reinforcements may be coated with the matrix while the reinforcements are inside print head(s) 18, 22, and 26, while the reinforcements are being passed to print head(s) 18, 22, and 26, and/or while the reinforcements are discharging from print head(s) 18, 22, and 26, as desired. In some embodiments, a filler material (e.g., chopped fibers, metallic or ceramic particles, etc.) may be mixed with the matrix before and/or after the matrix coats the reinforcements. The matrix, the dry reinforcements, reinforcements already coated with the matrix, and/or the filler may be transported into print head(s) 18, 22, and 26 in any manner apparent to one skilled in the art. The matrix-coated reinforcements may be caused to cure during discharge from print head(s) 18, 22, and 26 by way of one or more cure enhancers (e.g., UV lights, ultrasonic emitters, microwave generators, infrared heaters, chillers, etc.) 34 that are located adjacent (e.g., around) one or more corresponding nozzles 36 of print head(s) 18, 22, and 26.

Controller 32 may be provided and communicatively coupled with print head(s) 18, 22, and/or 26; actuators 27 and/or 35; and any number and type of cure enhancers 34. Controller 32 may embody a single processor or multiple processors that include a means for controlling an operation of system 10. Controller 32 may include one or more general- or special-purpose processors or microprocessors. Controller 32 may further include or be associated with a memory for storing data such as, for example, design limits, performance characteristics, operational instructions, matrix characteristics, reinforcement characteristics, characteristics of structure 12, and corresponding parameters (e.g., operational characteristics, error logs, telemetry, etc.) of each component of system 10. Various other known circuits may be associated with controller 32, including power supply circuitry, signal-conditioning circuitry, solenoid/motor driver circuitry, communication circuitry, and other appropriate circuitry. Moreover, controller 32 may be capable of communicating with other components of system 10 via wired and/or wireless transmission.

One or more maps may be stored in the memory of controller 32 and used during fabrication of structure 12. Each of these maps may include a collection of data in the form of lookup tables, graphs, and/or equations. In the disclosed embodiment, the maps are used by controller 32 to determine patient-support specifications, characteristics of cure enhancers 34, the matrix, and/or the reinforcements at different locations within structure 12. The patient-support specifications may include, among others, a type, quantity, density, geometry, and/or configuration of reinforcement and/or matrix to be discharged at a particular location within structure 12, and/or an amount, shape, and/or location of desired curing. Controller 32 may then correlate operation of actuators 27 and/or 35 (e.g., the location and/or orientation of print heads 18, 22, and/or 26) and/or the discharge of material from print head 18, 22, and/or 26 (a type of material, desired performance of the material, cross-linking of the material, a discharge rate, etc.) with the operation of cure enhancers 34, such that structure 12 is produced in a desired manner.

Structure 12 may be manufactured via an extrusion and/or a pultrusion process. For example, extrusion may occur when the matrix and the associated continuous reinforcements are pushed from print head(s) 18, 22, and 26 during the movement of actuators 27 and/or 33. Pultrusion may occur after a length of matrix-coated reinforcements is connected to an anchor (e.g., to print bed 14) and cured, followed by movement of print head(s) 18, 22, and 26 away from the anchor. The movement of print head(s) 18, 22, and 26 away from the anchor may cause the reinforcements to be pulled from the respective print head(s) 18, 22, and 26, along with the coating of the matrix.

In some embodiments, pultrusion may be selectively implemented to generate tension in the reinforcements that make up structure 12 and that remains after curing. In particular, as the reinforcements are being pulled from the respective print head(s) 18, 22, and 26, the reinforcements may be caused to stretch. This stretching may create tension within the reinforcements. As long as the matrix surrounding the reinforcements cures and hardens while the reinforcements are stretched, at least some of this tension may remain in the reinforcements and function to increase a strength of the resulting composite structure 12.

Components fabricated via conventional pultrusion methods may have increased strength in only a single direction (e.g., in the single direction in which fibers were pulled through the corresponding die prior to resin impregnation and curing). However, in the disclosed embodiment, the increased strength in structure 12 caused by residual tension within the corresponding reinforcements may be realized in the axial direction of each of the reinforcements. And because each reinforcements could be pulled in a different direction during discharge from print head(s) 18, 22, and 26, the tension-related strength increase may be realized in multiple (e.g., innumerable) different directions.

Structures fabricated via conventional pultrusion methods may have strength increased to only a single level (e.g., to a level proportionate to an amount in which the reinforcements were stretched by a pulling machine prior to resin impregnation and curing). However, in the disclosed embodiment, because the matrix surrounding each reinforcement may be cured and harden almost immediately upon discharge, the force pulling on the reinforcement may be continuously varied along the length of the fiber, such that different segments of the same reinforcement are stretched by different amounts. Accordingly, the residual tensile stress induced within each of the different segments of each different reinforcement may also vary, resulting in a variable strength within different areas of structure 12. This may be beneficial in variably loaded areas of structure 12.

INDUSTRIAL APPLICABILITY

The contoured network of tracks discharged from print head(s) 18, 22, and 26 may form a direct-contact support for the premature baby or the burn patient that is customized to the patient. For example, the patient's body may first be scanned (e.g., via a separate scanner—not shown), and a three-dimensional data set of critical support points may be responsively generated. The support points may correspond with areas of the body that should be avoided (i.e., areas that should not be contacted by structure 12) and/or provided with extra support. For example, the support points may circumvent and/or outline bruised, burned, crushed, infected, and other damaged areas of the patient. Similarly, a greater number of support points may be located at weak and/or underdeveloped areas of the body. The data set may be generated and electronically transmitted to controller 32 via any manner known in the art.

After receiving the data set of critical support points, controller 32 may regulate system 10 to fabricate structure 12 based on the information. For example, controller 32 may cause particular materials (e.g., soft, pliable, flexible, rigid, antimicrobial, non-adhesive, and other specialized materials) to be loaded into heads 18, 22, and/or 26 in preparation for structure fabrication. Controller 32 may thereafter selectively energize actuator 27, actuators 35, and/or heads 18, 22, 26 to simultaneously and/or sequentially move and/or discharge material in a particular pattern to create corresponding support at each of the specified data points. This control may allow for variable shape, size, spacing, and/or location of the tracks discharged by heads 18, 22, 26. It is contemplated that, as the patient progresses, the process may be repeated to fabricate a modified structure 12 that better supports the changing needs of the patient.

Once the patient has recovered sufficiently, structure 12 may be disposed of. This may be fairly simple and involve the crushing of the lattice network of columns, crosslinking, and contours into a compact volume that can easily be recycled or discarded.

The reinforcements used to fabricate structure 12 may do more than impart strength-type properties. For example, metallic wires and/or optical tubes could be embedded within the matrix in the same way that strength-inducing fibers are. Thereafter, these metallic wires and/or optical tubes could be connected to power sources, interrogators, controllers, and other devices, and used to warm the patient, to monitor patient health, etc.

System 10 may be used for non-medical purposes, if desired. For example, the process of extruding/pultruding material in the z-direction until the threshold distance d and/or pixilated upper surface is achieved, followed by transverse and interconnecting movements in the x- and/or y-directions by z-plate 16 may be used to quickly and efficiently create internal and/or external support structures 12. In addition, the ability to selectively turn particular print heads 18 on-or-off during the movement of z-plate 16 may allow for varied contours and/or voids to be formed at desired locations inside of structures 12. These structures 12 may then be used during manufacture of vehicles (e.g., automobile frames, naval frames, aerospace frames, etc.), during building construction (e.g., construction of internal frames, walls, doors, and/or windows), or during any other type of construction.

It will be apparent to those skilled in the art that various modifications and variations can be made to the disclosed additive manufacturing system. Other embodiments will be apparent to those skilled in the art from consideration of the specification and practice of the disclosed additive manufacturing system. For example, although a composite material (e.g., a matrix and a reinforcement) is described as being discharged from print heads 18, 22, and 26, it is contemplated that only the matrix or only the reinforcement may be selectively discharged from one or more of print heads 18, 22, and/or 26, if desired. It is intended that the specification and examples be considered as exemplary only, with a true scope being indicated by the following claims and their equivalents.

What is claimed is:

1. An additive manufacturing system, comprising:
   a plate having a plurality of print heads arranged in a grid and each configured to discharge a curable material;
   a first actuator configured to move the plate only in a z-direction that is normal to the plate during discharge of the curable material through the plurality of print heads of the plate;
   at least one shuttle having a plurality of print heads arranged in a row and each configured to discharge a curable material;
   at least one cure enhancer associated with at least one of the plate and the at least one shuttle, the at least one cure enhancer being configured to cure the curable material as the curable material is being discharged; and
   a second actuator configured to move the at least one shuttle in at least one of an x-direction and a y-direction that is normal to the z-direction during discharge of the curable material through the plurality of print heads of the at least one shuttle.

2. The additive manufacturing system of claim 1, wherein the at least one actuator is further configured to rotate the at least one shuttle.

3. The additive manufacturing system of claim 1, wherein:
   the first actuator is one of a hydraulic piston and an electric lead screw; and
   the second actuator is one of a robot arm, a gantry, and an arm/gantry hybrid.

4. The additive manufacturing system of claim 1, further including:
   a print bed; and
   a controller in communication with the first and second actuators, the controller being configured to:
      cause the first actuator to move the plate in a direction normal to the print bed during discharging to fabricate a plurality of columns; and
      cause the second actuator to move the at least one shuttle in a transverse direction after the plurality of columns have reached a threshold height, to cross-link the plurality of columns.

5. The additive manufacturing system of claim 1, further including:
   a print bed; and
   a controller in communication with the first and second actuators, the controller being configured to:
      cause the first actuator to move the plate in a direction normal to the print bed during discharging to fabricate a plurality of columns; and
      cause the second actuator to move the at least one shuttle in a transverse direction to create continuous contours over terminal ends of the plurality of columns.

6. The additive manufacturing system of claim 5, wherein the controller is configured to selectively active the plate, the first actuator, and the second actuator to discharge material based on a body scan of a patient to circumvent a damaged area of the patient.

7. The additive manufacturing system of claim 1, wherein the plurality of heads of the at least one of the plate and the at least one shuttle are individually operable to selectively discharge material.

8. The additive manufacturing system of claim 1, wherein the plurality of heads of the at least one of the plate and the at least one shuttle are individually operable to extend a different distance.

9. The additive manufacturing system of claim 1, wherein the at least one shuttle includes:
   an x-shuttle; and
   a y-shuttle configured to move in a direction orthogonal to a movement direction of the x-shuttle.

10. The additive manufacturing system of claim 1, wherein the curable material is a composite including a continuous reinforcement that is at least partially coated in a matrix.

11. An additive manufacturing system, comprising:
    a print bed;
    a z-plate having a plurality of print heads arranged in a grid and each configured to discharge a curable material onto the print bed to create a plurality of columns that extend only in a direction normal to the print bed;
    an x-shuttle having a plurality of print heads arranged in a row and each configured to discharge a curable material during movement in a direction generally orthogonal to a movement direction of the z-plate;
    a y-shuttle having a plurality of print heads arranged in a row and each configured to discharge a curable material during movement in a direction generally orthogonal to the movement direction of the z-plate and generally orthogonal to the movement direction of the x-shuttle;
    a cure enhancer associated configured to cure the curable material as the curable material is being discharged;
    at least one actuator configured to move at least one of the z-plate, the x-shuttle, and the y-shuttle during discharge of the curable material; and
    a controller in communication with the cure enhancer and the at least one actuator, the controller being configured to:

cause the at least one actuator to move the z-plate in the direction normal to the print bed during discharging to fabricate a plurality of columns having different heights;

cause the at least one actuator to move the x- and y-shuttles in directions generally orthogonal to the normal direction after the plurality of columns have reached a threshold height, to create continuous contours over terminal ends of the plurality of columns; and cause the cure enhancer to expose the curable material to cure energy during discharge.

12. A method of fabricating a support structure, comprising:

simultaneously discharging from a grid of print heads a plurality of columns in only an axial direction of the columns;

cross-linking the plurality of columns; and simultaneously discharging a plurality of adjacent tracks that form a row of continuous contours across ends of the plurality of columns.

13. The method of claim 12, further including exposing a material in the plurality of columns and plurality of tracks to a cure energy.

14. The method of claim 13, wherein simultaneously discharging the plurality of columns includes discharging the plurality of columns to different heights.

15. The method of claim 14, wherein discharging the plurality of columns to different heights includes discharging the plurality of columns to different heights based on a body scan of a patient to avoid an injured area of the patient.

16. The method of claim 12, further including temporarily pausing discharging of the plurality of columns after the plurality of columns have reached a threshold height, and until cross-linking of the plurality of columns has been completed.

* * * * *